(12) United States Patent
Govil et al.

(10) Patent No.: US 8,830,549 B2
(45) Date of Patent: Sep. 9, 2014

(54) HOLOGRAPHIC DISLPAY USING LIQUID CRYSTAL DISPLAY DEVICE OPERATING WITH UNPOLORIZED LIGHT

(75) Inventors: Alok Govil, Santa Clara, CA (US); Lucian Remus Albu, Forest Hills, NY (US)

(73) Assignee: Koninklijke Philips N.V., Eindhoven (NL)

(*) Notice: Subject to any disclaimer, the term of this patent is extended or adjusted under 35 U.S.C. 154(b) by 1079 days.

(21) Appl. No.: 12/303,964

(22) PCT Filed: May 29, 2007

(86) PCT No.: PCT/IB2007/052015
§ 371 (c)(1),
(2), (4) Date: Jun. 7, 2010

(87) PCT Pub. No.: WO2007/141707
PCT Pub. Date: Dec. 13, 2007

(65) Prior Publication Data
US 2010/0238527 A1 Sep. 23, 2010

Related U.S. Application Data

(60) Provisional application No. 60/812,352, filed on Jun. 9, 2006.

(51) Int. Cl.
*G03H 1/08* (2006.01)
*G03H 1/22* (2006.01)

(52) U.S. Cl.
CPC ......... *G03H 1/2294* (2013.01); *G03H 2240/15* (2013.01); *G03H 2222/31* (2013.01); *G03H 2225/52* (2013.01); *G03H 2225/22* (2013.01)
USPC ............................................. 359/9

(58) Field of Classification Search
CPC ............ G03H 1/2294; G03H 2240/15; G03H 2222/31; G03H 2225/52; G03H 2225/22
See application file for complete search history.

(56) References Cited

U.S. PATENT DOCUMENTS 3,890,035 A 6/1975 Takeda
5,260,815 A 11/1993 Takizawa
(Continued)

FOREIGN PATENT DOCUMENTS

EP 0450644 A2 10/1991
WO WO02093839 A2 11/2002
(Continued)

OTHER PUBLICATIONS

H. Munjuluri et al., "Dynamic Holographic 3D Image Projection", Optics Express, Optical Society of America, Washington, DC, vol. 11, No. 5, Mar. 2003, pp. 437-445, XP002336931.
(Continued)

*Primary Examiner* — Jennifer L. Doak
(74) *Attorney, Agent, or Firm* — Larry Liberchuk

(57) ABSTRACT

An electroholographic display system (800, 900) for displaying a holographic image, includes a coherent light source (830, 930) producing a coherent, collimated, light beam; a spatial light modulator (SLM) (820, 920) adapted to receive and spatially modulate the coherent, collimated, light beam to produce therefrom a spatially modulated light beam including first portions having a first polarization and second portions having a second polarization orthogonal to the first polarization; and a processor and driver unit (810, 910) adapted to generate hologram data representing a holographic image and to apply appropriate voltages to the pixels of the SLM to cause the SLM to modulate the coherent collimated light beam with the hologram data. The spatially modulated light beam is projected to an image plane to produce the holographic image including the first portions having the first polarization and the second portions having a second polarization orthogonal to the first polarization.

12 Claims, 11 Drawing Sheets

(56) References Cited

U.S. PATENT DOCUMENTS

| | | |
|---|---|---|
| 6,151,094 A | 11/2000 | Wu |
| 6,805,445 B2 | 10/2004 | Silverstein |
| 6,954,252 B1 | 10/2005 | Crossland |
| 2003/0147112 A1* | 8/2003 | Mukawa ............ 359/15 |
| 2004/0239835 A1 | 12/2004 | Jung |
| 2005/0270616 A1* | 12/2005 | Weiner ............ 359/246 |

FOREIGN PATENT DOCUMENTS

| | | |
|---|---|---|
| WO | WO03048819 A1 | 6/2003 |
| WO | WO2005059881 A2 | 6/2005 |

OTHER PUBLICATIONS

Carl R. Stevenson, "Functional Requirements for the 802.22 WRAN Standard", IEEE 80222-05/0007r39, Aug. 2005, WK3C Wireless LLC, XP002425031.

G. Cervello et al., Dynamic Channel Selection (DCS) Scheme for 802.11, IEEE P802.11 Wireless LANs, Jul. 2000, IEEE 802.11-00/195, XP002213585.

\* cited by examiner

HOLOGRAPHIC DISLPAY USING LIQUID CRYSTAL DISPLAY DEVICE OPERATING WITH UNPOLORIZED LIGHT

This invention pertains to the holographic displays, and more particularly to an electro-holographic display device using a liquid crystal display device as a spatial light modulator.

Holography is a method of recording and reproducing three-dimensional (3-D) images. In contrast with photography, which is generally a point-to-point recording and reproduction of the intensity (amplitude) of light rays that make up an image, in holography both the amplitude and the phase of the light (usually at one particular wavelength) are recorded. When reproduced, the resulting light field is identical to that which emanated from the original object or scene, giving a perfect three-dimensional image.

FIG. 1 illustrates a system 100 and method of recording a 3-D image of an object 25. System 100 includes a light source 110, beamsplitter 120, mirror 130, and image recording device 140. Beneficially, light source 110 is a laser or other coherent light generating device. Image recording device 140 may be a photographic plate.

Operationally, light source 100 provides a coherent light beam to beamsplitter 120. Beamsplitter 120 passes a first portion of the coherent light beam to impinge upon object 25 as an illumination beam, and reflects a second portion of coherent light beam as a reference beam. Mirror 130 directs the reference beam toward image recording device 140. From the illumination beam, the object 25 produces an object beam which is combined with the reference beam at image recording device 140. Optical interference between the reference beam and the object beam, due to the superposition of the light waves, produces a series of intensity fringes. These fringes form a type of diffraction grating and are recorded on image recording device 140.

When the recorded image is reproduced, diffraction from the fringe pattern reconstructs the original object beam in both intensity and phase. Because both the phase and intensity are reproduced, the image appears three-dimensional; the viewer can move her viewpoint and see the image rotate exactly as the original object would.

Recently electroholographic display systems have been developed to generate full three-dimensional ("3-D") reconstructions of images. In particular, electroholographic display systems are being developed using spatial light modulators.

Meanwhile, it is k known to use a liquid crystal display (LCD) device as a spatial light modulator in a 2-D display system.

FIGS. 2A-B illustrate principles of operation of a reflective LCD device which may be employed as a spatial light modulator in a 2-D display system. As shown in FIGS. 2A-B, reflective LCD 200 includes a liquid crystal (LC) material layer 210 disposed between first and second substrates 220, 230. First substrate 220 is transparent. Disposed on (although not necessarily directly on) second substrate 230 is a reflective material 240 such as an aluminum layer. Beneficially, reflective material 240 forms reflective pixel electrodes which are applied with a voltage to turn on or off an associated pixel of LCD device 200. In the example of FIGS. 2A-B, the liquid crystals of LC material layer 210 are normally twisted in a helix when no voltage is applied (FIG. 2A), and are aligned in a first linear direction when an electric field is applied (FIG. 2B).

A polarizing beamsplitter 50 is provided in FIGS. 2A-B to direct light to and from the LCD device 200. In particular, polarizing beamsplitter 50 acts as a polarizer when directing light to LCD device 200, and acts as an analyzer when directing light from LCD device 50 to a display screen 75.

FIG. 2A shows a case where no voltage is applied across the LC material layer 210. Operationally, polarizing beamsplitter 50 operates to reflect light having a first (p) polarization toward LCD device 200. In that case, the light impinging on LCD device 200 passes through transparent first substrate 220 and LC material layer 210 to reach the reflective pixel electrodes. In passing through LC material layer 210, the polarization of the light is rotated by 45 degrees, since the applied voltage is zero. The light is then reflected by the reflective pixel electrodes back through LC material layer 210 to emerge from transparent first substrate 220. In passing back LC material layer 210, the polarization of the light is rotated by an additional 45 degrees, yielding a total polarization rotation of 90 degrees. Accordingly, the light emerging from LCD device 200 is rotated 90 degrees (orthogonally polarized) with respect to the light entering LCD device 200, and has a second (s) polarization. Polarizing beamsplitter 50 is configured as an analyzer so that light having the second (s) polarization passes therethrough, for example to display screen 75.

Meanwhile, FIG. 2B shows a case where a voltage is applied across LC material layer 210 sufficient to align the liquid crystals along a first direction in parallel with the direction of the first polarization (p). In that case, the light passes through LC material layer 210, reflects back from the reflective pixel electrodes, and passes back through LC material layer 210 essentially without any change in polarization. Accordingly, the light emerging from LCD device 200 has the same first (p) polarization as the light entering LCD device 200. As noted above, polarizing beamsplitter 50 is configured as an analyzer so that the light having the first (p) polarization is reflected away from display screen 75.

Accordingly, LCD device 200 can act as a spatial light modulator which selectively modulates the phase and polarization of light in accordance with voltages that are selectively applied to each pixel in order to reproduce a desired image.

Similarly, FIGS. 3A-B illustrate principles of operation of a transmissive LCD device which may be employed as a spatial light modulator in a 2-D display system. As shown in FIGS. 3A-B, reflective LCD 300 includes a liquid crystal (LC) material layer 310 disposed between first and second transparent substrates 320, 330. Beneficially, on one or both substrates 320, 330 are provided transparent pixel electrodes which are applied with a voltage to turn on or off an associated pixel of LCD device 300. In the example of FIGS. 3A-B, the liquid crystals of LC material layer 310 are normally twisted in a helix when no voltage is applied (FIG. 3A), and are aligned in a first linear direction when an electric field is applied (FIG. 3B).

A polarizer 55 is provided in FIGS. 3A-B to polarize the light provided to the LCD device 300. Meanwhile, light emerging from LCD device 300 is provided to analyzer 57 and thence to a display screen 75.

FIG. 3A shows a case where no voltage is applied across the LC material layer 310. Operationally, polarizer 55 operates to pass light having a first (p) polarization toward LCD device 300, and to reject light having a second (s) polarization orthogonal to the first polarization. In that case, the light impinging on LCD device 300 passes through transparent first substrate 320 and LC material layer 310 to reach the transparent second substrate 330. In passing through LC material layer 310, the polarization of the light is rotated by 90 degrees. Accordingly, the light emerging from LCD device 300 is rotated 90 degrees (orthogonally polarized) with respect to the light entering LCD device 300, and has the second (s) polarization. Analyzer 57 is configured so that light having the second (s) polarization passes therethrough, for example to display screen 75, and rejects light having the first (p) polarization.

Meanwhile, FIG. 3B shows a case where a voltage is applied across LC material layer 310 sufficient to align the liquid crystals along a first direction in parallel with the direction of the first polarization (p). In that case, the light passes through LC material layer 310 without any change in polarization. Accordingly, the light emerging from LCD device 300 has the same first (p) polarization as the light entering LCD device 300. As noted above, analyzer 57 is configured to reject light having the first (p) polarization.

Accordingly, LCD device 300 can act as a spatial light modulator (SLM) which selectively modulates light in accordance with voltages that are selectively applied to each pixel in order to reproduce a desired image.

However, there are disadvantages to using an LCD as configured in FIGS. 2A-B and 3A-B as a spatial light modulator for a 3-D display apparatus. It is noted above that in order to generate black pixels, analyzer 57 blocks the light. The energy of the light blocked gets wasted.

FIG. 4 shows a screen illuminated by a collimated beam of light from behind (illumination is not shown). We arbitrarily divide parts on the screen into two—one of which is shaded grey while the other one is white. The field because of these two parts, at any point, points in almost opposite directions. This results in almost complete cancellation of the field. The remaining field comprises of the field that is "effectively" from just one point on the screen. This corresponds to the zeroth order diffraction beam, which does not convey the important information in a 3-D hologram.

Since the field almost cancels out, intensity of light at any point is relatively less. This effect of cancellation of field is called Babinet's principle.

FIG. 5 shows an example of division of the screen into dark and bright 'fringes' called Fresnel zone plate. In FIG. 6 the bright and dark areas of FIG. 5 are inverted. If the field is allowed to pass from both of these plates super-imposed on each other, the field almost cancels out because of Babinet's principle briefly described above.

If the pattern of FIG. 5 is put on the LCD system of FIGS. 3A-B, the dark areas in FIG. 5 block the light field (which would correspond to the bright areas in FIG. 6). In this manner, the field contribution of one of the two areas is blocked. This is shown by the absence of one field vector (arrow) in FIG. 7.

As a result, this results in high intensity of light at a particular point. The position of this point depends on the parameters of the Fresnel zone plate used. Since the analyzer of the LCD panel blocked the second field vector, this results in wastage of the energy, as mentioned before.

Accordingly, it would be desirable to provide a electroholographic display device which can provide a brighter image. It would further be desirable to provide a method of electro-holographic display that produces a brighter image with less wasted light.

In one aspect of the invention, an electroholographic display system for displaying a holographic image comprises: a coherent light source adapted to produce a coherent, collimated, light beam; a spatial light modulator (SLM) adapted to receive and spatially modulate the coherent, collimated, light beam to produce therefrom a spatially modulated light beam including first portions having a first polarization and second portions having a second polarization orthogonal to the first polarization; and a processor and driver unit adapted to generate hologram data representing a holographic image and to apply appropriate voltages to the pixels of the SLM to cause the SLM to modulate the coherent collimated light beam with the hologram data, wherein the spatially modulated light beam is projected to an image plane to produce the holographic image including the first portions having the first polarization and the second portions having a second polarization orthogonal to the first polarization.

In another aspect of the invention, a method of displaying a holographic image comprises: providing a coherent, collimated light beam to a spatial light modulator (SLM) comprising a plurality of pixels; applying appropriate voltages to the pixels of the SLM to cause the SLM to modulate the coherent collimated light beam with hologram data to produce therefrom a spatially modulated light beam including first portions having a first polarization and second portions having a second polarization orthogonal to the first polarization; and projecting the spatially modulated light beam to an image plane to produce the holographic image including the first portions having the first polarization and the second portions having a second polarization orthogonal to the first polarization.

FIG. 1 illustrates a system and method of recording a 3-D image of an object;

FIGS. 2A-B illustrate principles of operation of a reflective LCD device;

FIGS. 3A-B illustrate principles of operation of a transmissive LCD device;

Figure 8:
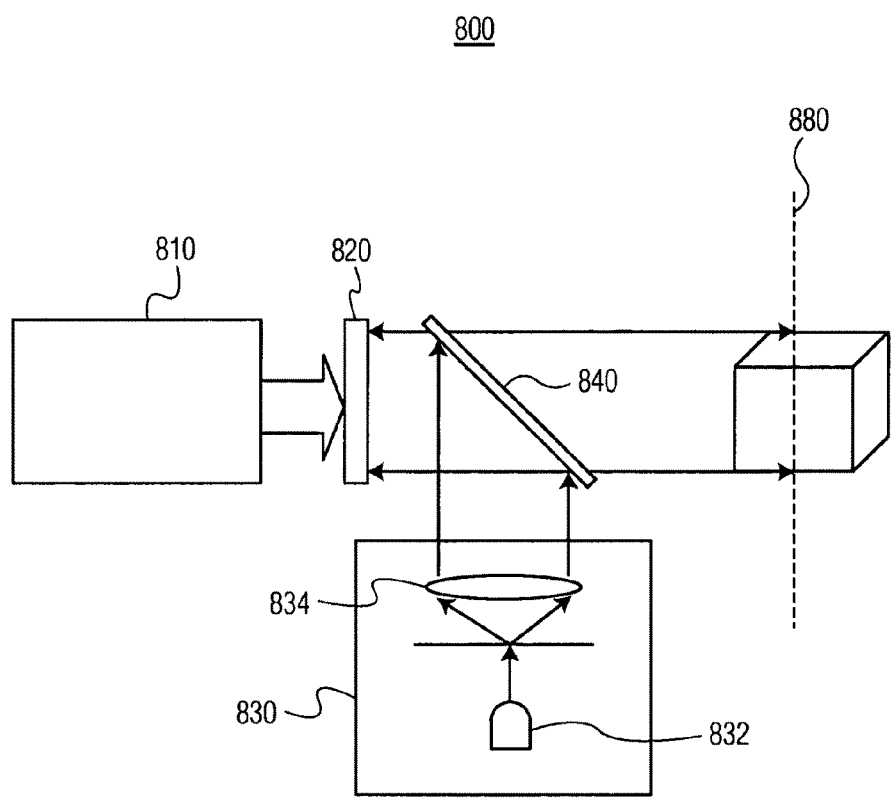
FIG. 8 shows a first embodiment of an electroholographic display system.

FIG. 8 shows one embodiment of an electroholographic display system 800. Electroholographic display system 800 comprises a processor and driver unit 810, spatial light modulator (SLM) 820, coherent light source 830, and a beamsplitter 840. Processor and driver unit 810 may comprise separate circuits or components of the processor and the driver, and may include memory such as read only memory (ROM), random access memory (RAM), etc. Beneficially, software for executing various algorithms is stored in memory in processor and driver unit 810. Beneficially, SLM 820 is a reflective liquid crystal display (LCD), such as a reflective liquid crystal on silicon (LCOS) device. In one embodiment, coherent light source 830 comprises a laser emitting diode (LED) 832 and collimation optics 834. Alternatively, another laser generation device or other coherent light generator may be employed. In some embodiments, beamsplitter 840 may be omitted, provided that another means or optical configuration is provided for directing light from coherent light source 830 onto SLM 820, and modulated light from SLM 820 toward a desired image plane 880.

Operationally, LED 832 provides a light beam to collimation optics 834 which collimates and sizes the light beam appropriately for SLM 820. That is, beneficially, the light beam is sized and shaped so as to substantially completely illuminate all of the pixels of SLM 820 simultaneously (in contrast to so-called scanning-color systems). The coherent, collimated light beam from light source 830 is provided to beamsplitter 840, which directs the coherent, collimated light beam onto SLM 820. Meanwhile, processor and driver unit 810 generates hologram data and applies the data to drive the pixels of SLM 820. In response to the data driving each of the pixels of SLM 820, the coherent, collimated light beam is spatially modulated to generate a spatially modulated light beam which is reflected back to beamsplitter 840. Beamsplitter 840 passes the spatially modulated light beam therethrough to image plane 880. At image plane 880, the diffracted light from each of the pixels of SLM 820 adds together to produce the desired holographic image.

Figure 9:
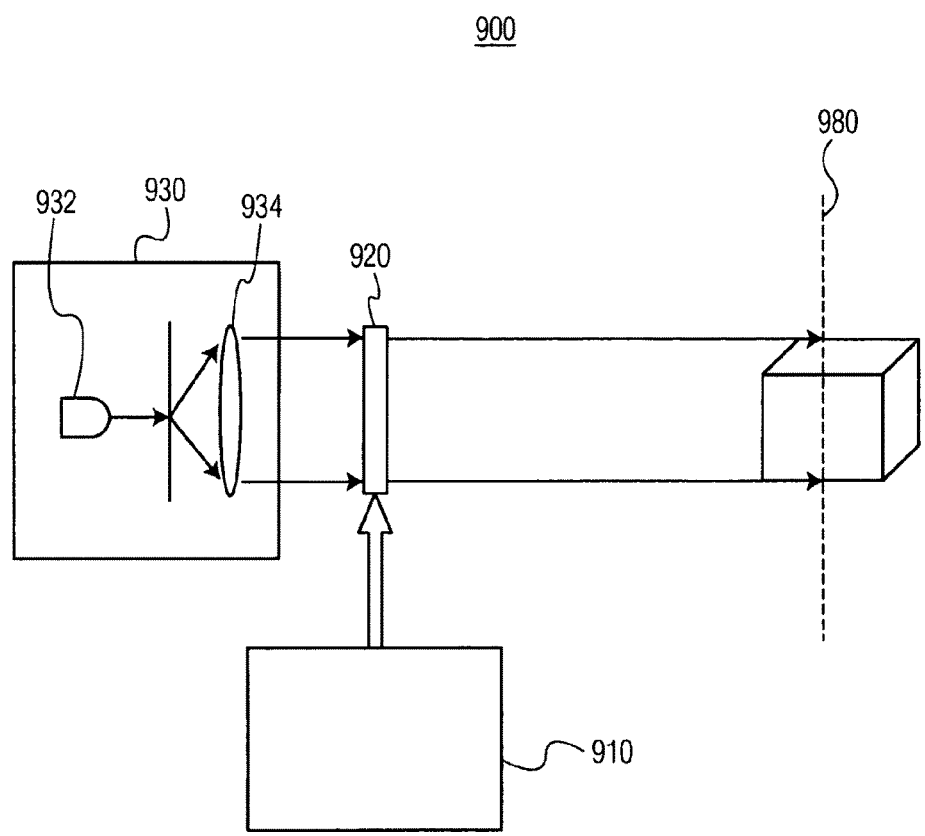
FIG. 9 shows a second embodiment of an electroholographic display system.

Beneficially, electroholographic display system 800 does not include any analyzer in the optical path between the output of SLM 820 and the image plane 880. Accordingly, as will be explained in further detail below with respect to FIG. 10, the spatially modulated light beam output by SLM 820 to image plane 880 includes Meanwhile, FIG. 9 shows a second embodiment of an electroholographic display system 900.

Electroholographic display system 900 comprises a processor and driver unit 910, spatial light modulator (SLM) 920, and coherent light source 930. Processor and driver unit 910 may comprise separate circuits or components of the processor and the driver, and may include memory such as read only memory (ROM), random access memory (RAM), etc. Beneficially, software for executing various algorithms is stored in memory in processor and driver unit 910. Beneficially, SLM 920 is a transmissive liquid crystal display (LCD) device. In one embodiment, coherent light source 930 comprises a laser emitting diode (LED) 932 and collimation optics 934. Alternatively, another laser generation device or other coherent light generator may be employed.

Operationally, LED 932 provides a light beam to collimation optics 934 which collimates and sizes the light beam appropriately for SLM 920. That is, beneficially, the light beam is sized and shaped so as to substantially completely illuminate all of the pixels of SLM 920 simultaneously (in contrast to so-called scanning-color systems). The coherent, collimated light beam from light source 930 is provided to a rear substrate of SLM 920. Meanwhile, processor and driver unit 910 generates hologram data and applies the data to drive the pixels of SLM 920. In response to the data driving each of the pixels of SLM 920, the coherent, collimated light beam is spatially modulated to generate a spatially modulated light beam which is passed out of a front substrate of SLM 920 to image plane 980. At image plane 980, the diffracted light from each of the pixels of SLM 920 adds together to produce the desired holographic image.

Beneficially, electroholographic display system 900 does not include any analyzer in the optical path between the output of SLM 920 and the image plane 980. Also beneficially, coherent light source 930 provides unpolarized light to SLM 920, which does not include any polarizer at its input.

Figure 1:
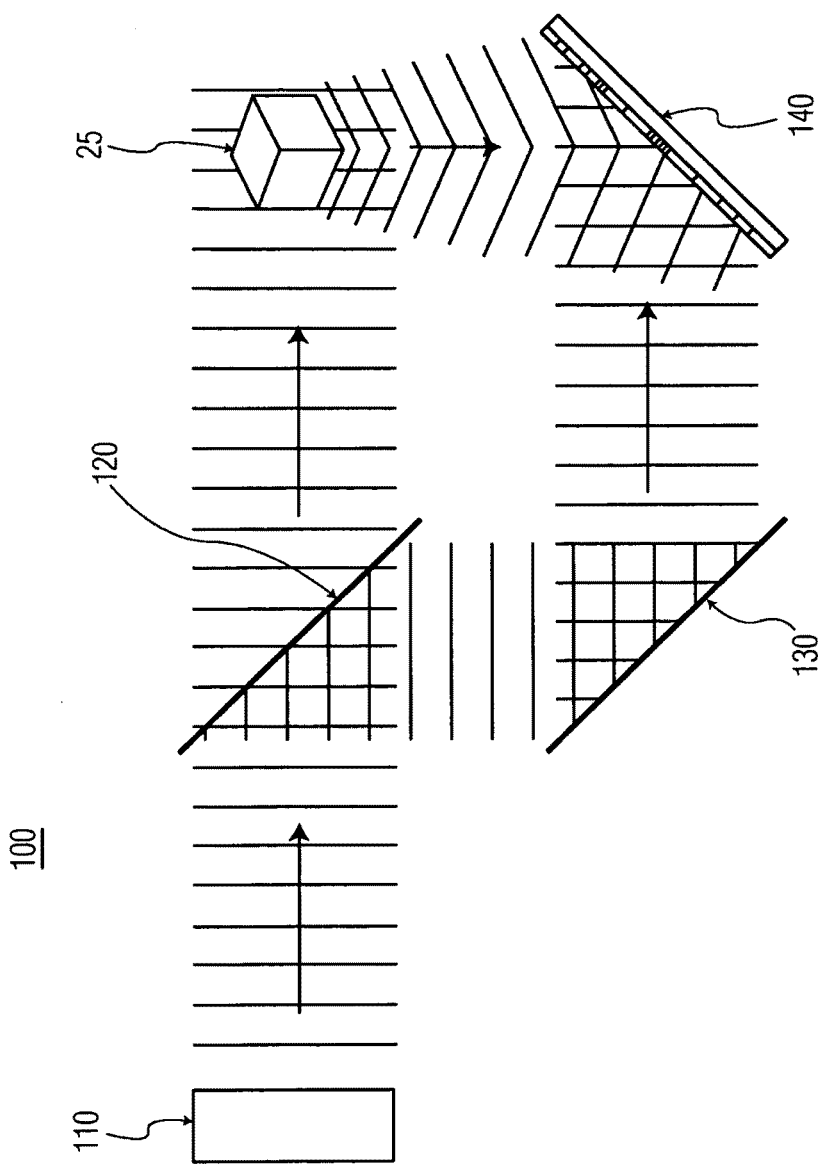
Figure 2A:
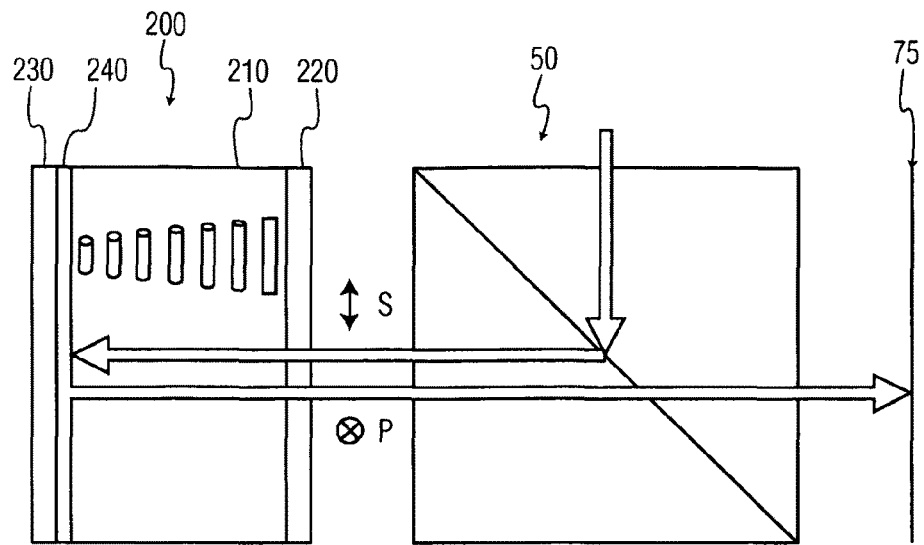
Figure 2B:
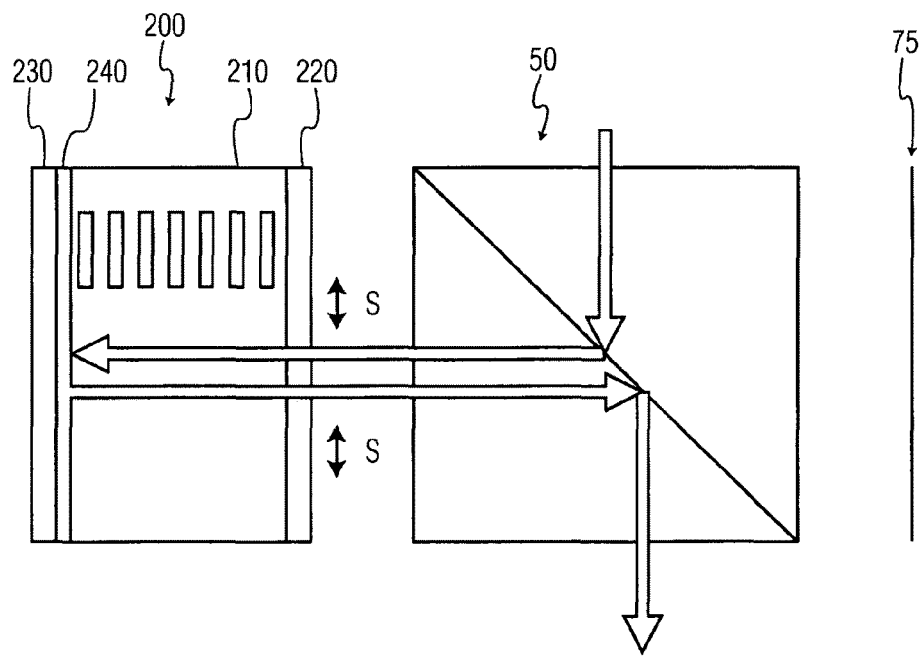
Figure 3A:
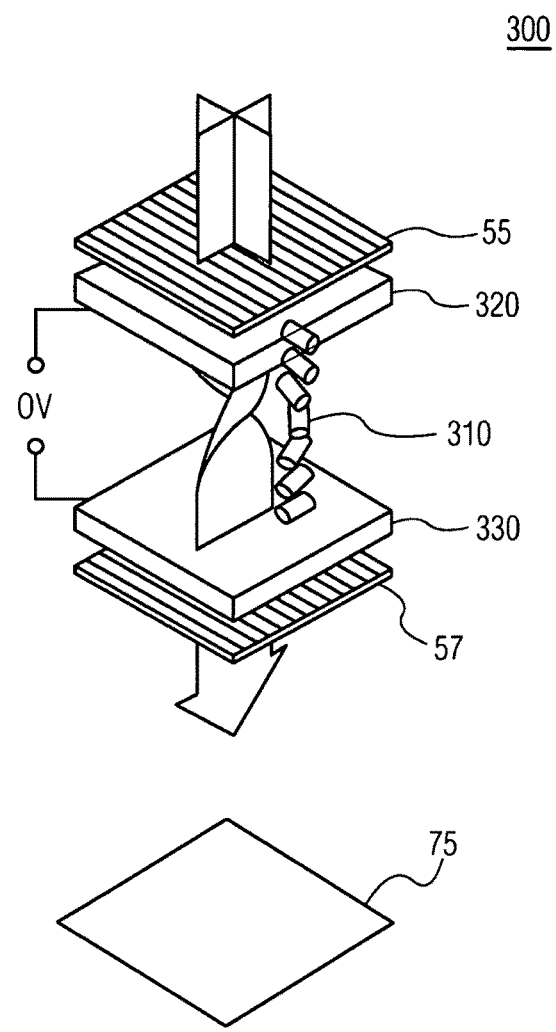
Figure 3B:
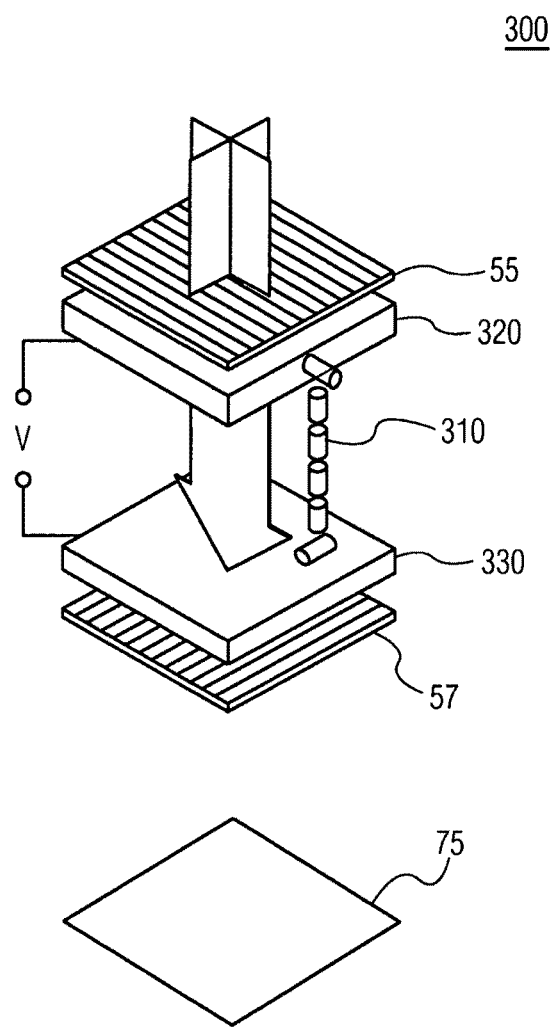
Figure 4:
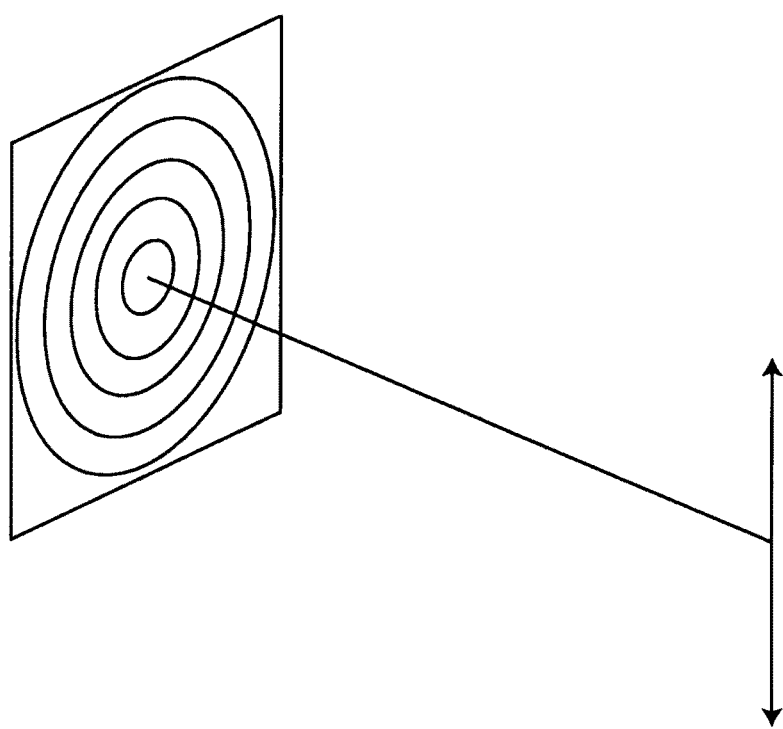
FIG. 4 shows a screen illuminated by a collimated beam of light from behind.
Figure 5:
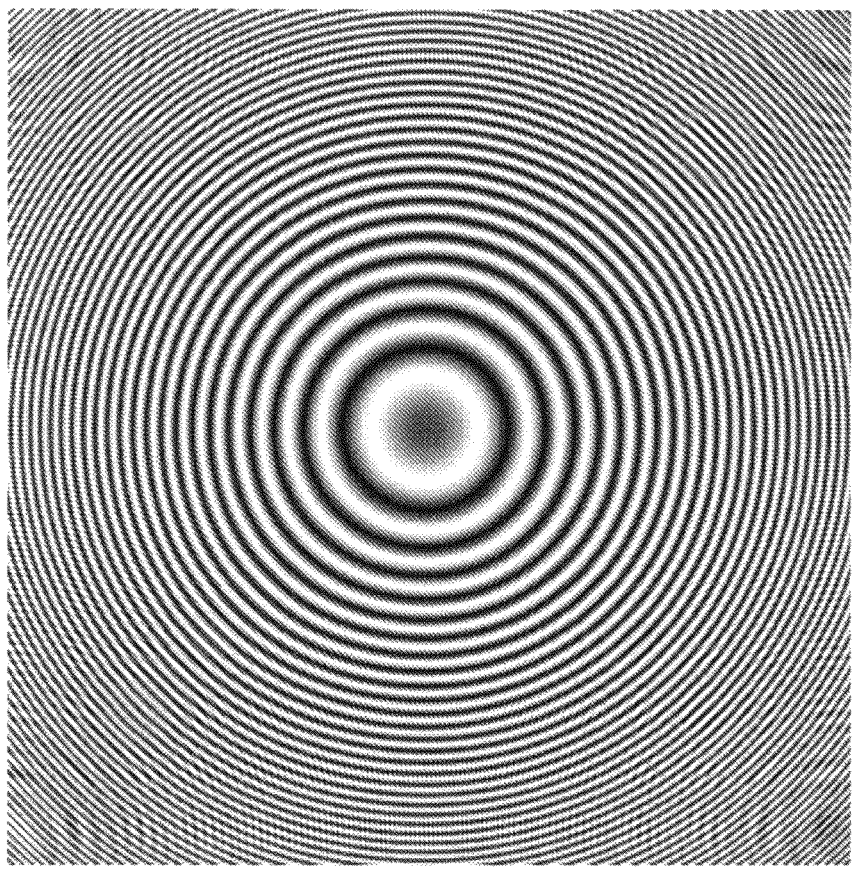
FIG. 5 shows an example of division of the screen into dark and bright 'fringes' called Fresnel zone plate.
Figure 6:
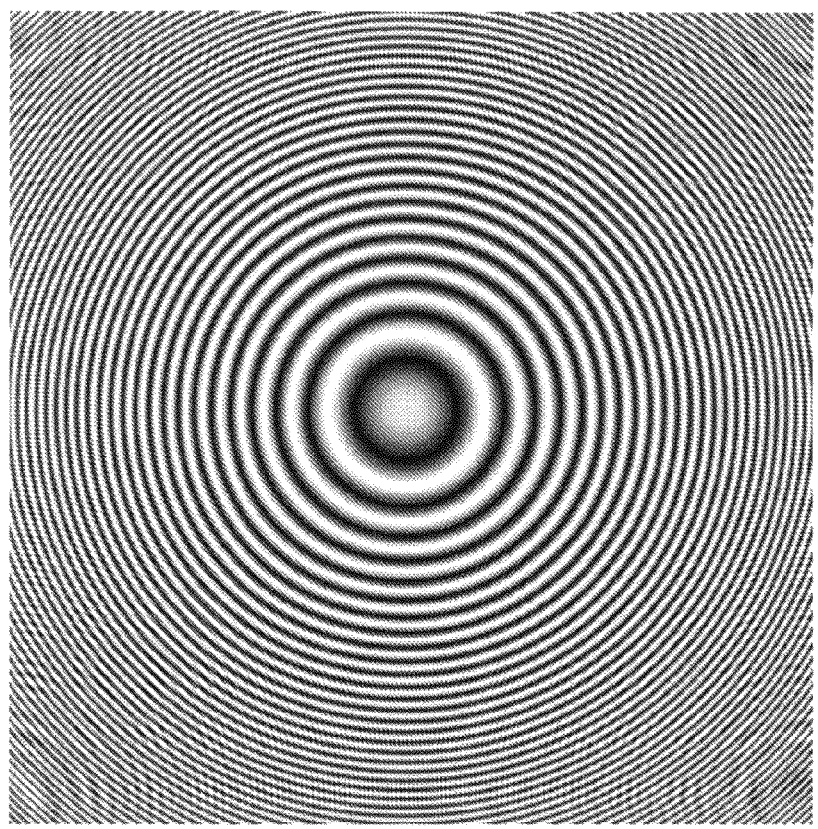
FIG. 6 shows a Fresnel zone plate where the bright and dark areas of FIG. 5 are inverted.
Figure 10:
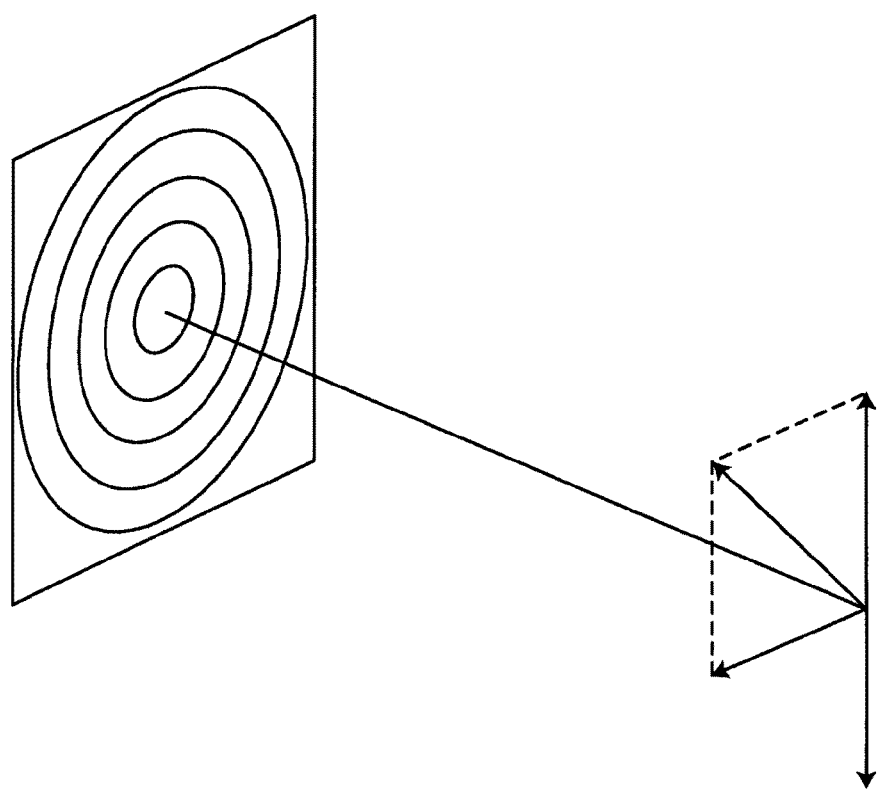
FIG. 10 shows a screen illuminated by a collimated beam of light from behind generated from the system of FIG. 8 or FIG. 9.

FIG. 10 shows what happens with the systems of FIGS. 8 and 9 when appropriate voltages are applied to the pixels, which may or may not be the same as the ones used for a system which includes an analyzer. The shaded arrow shows the direction in which the field vector would have been if an LCD system that included an analyzer was not rotating the plane of polarization of the incident beam. With the analyzer removed and the phase of the light rotated, this arrow points at an angle of 90 degrees to the shaded arrow, and is shown by the arrow pointing "south-west." Since the two arrows do not point in the opposite directions as was the case in FIG. 4, but instead are perpendicular to each other, these two vectors do not cancel but add, resulting in the arrow pointing north-west, which shows the vector sum of other two arrows.

Figure 7:
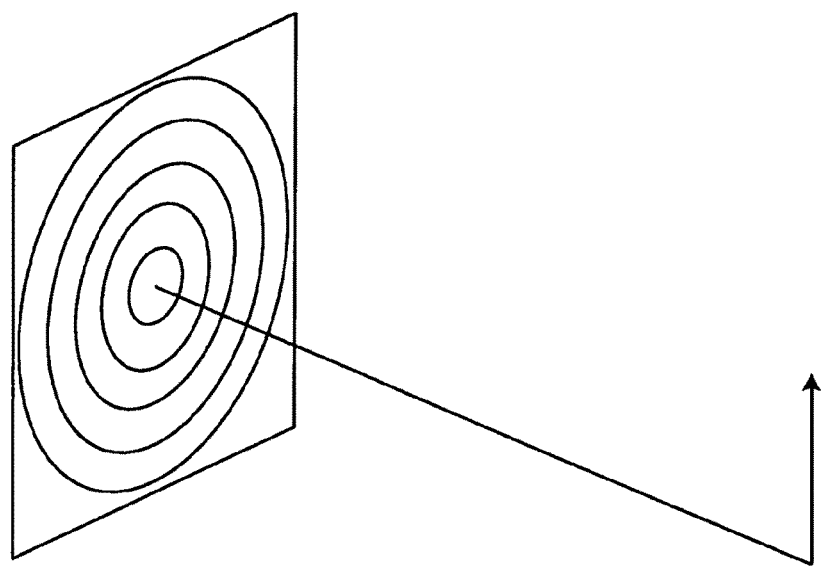
FIG. 7 shows a screen illuminated by a collimated beam of light from behind when the pattern of FIG. 5 is placed on the LCD.

Thus, in the systems of FIGS. 8 and 9, the energy of the second field is not wasted, but adds to the energy of the first field, while still not resulting in cancellation of the intensity of the field at the point of interest. As a result of this, the intensity of the point (brightness) in this system is higher than the intensity for the system of FIG. 7.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

The invention claimed is:

1. An electroholographic display system for displaying a holographic image, comprising:
   a coherent light source adapted to produce a coherent, collimated, unpolarized light beam;
   a spatial light modulator (SLM) adapted to receive and spatially modulate the coherent, collimated, unpolarized light beam to produce therefrom a spatially modulated light beam including first portions having a first polarization and second portions having a second polarization orthogonal to the first polarization; and
   a processor and driver unit adapted to generate hologram data representing a holographic image and to apply appropriate voltages to the pixels of the SLM to cause the SLM to modulate the coherent, collimated, unpolarized light beam with a fringe pattern of the hologram data,
   wherein the fringe pattern is used to drive the applied voltages to the individual pixels of the SLM,
   wherein the spatially modulated light beam is projected to an image plane to produce the holographic image including the first portions having the first polarization and the second portions having a second polarization orthogonal to the first polarization, wherein the first portions and second portions have substantially the same amplitude modulation at the image plane.

2. The system of claim 1, wherein the SLM is a reflective liquid crystal display (LCD) device.

3. The system of claim 2, further comprising a beamsplitter adapted to direct the coherent collimated light beam from the coherent light source to the reflective LCD device and to direct the modulated light beam from the reflective LCD device to the image plane.

4. The system of claim 1, where the SLM is a reflective liquid crystal on silicon (LCOS) device.

5. The system of claim 4, further comprising a beamsplitter adapted to direct the coherent collimated light beam from the coherent light source to the reflective LCOS device and to direct the modulated light beam from the SLM to the image plane.

6. The system of claim 1, wherein the SLM is a transmissive liquid crystal display (LCD) device.

7. The system of claim 1, wherein the coherent light source is a laser.

8. A method of displaying a holographic image, comprising:
   providing a coherent, collimated, unpolarized light beam to a spatial light modulator (SLM) comprising a plurality of pixels;

applying appropriate voltages to the pixels of the SLM to cause the SLM to modulate the coherent, collimated, unpolarized light beam with a fringe pattern Of hologram data to produce therefrom a spatially modulated light beam including first portions having a first polarization and second portions having a second polarization orthogonal to the first polarization; and projecting the spatially modulated light beam to an image plane to produce the holographic image including the first portions having the first polarization and the second portions having a second polarization orthogonal to the first polarization, wherein the first portions and second portions have substantially the same amplitude modulation at the image plane, wherein the fringe pattern is used to drive the applied voltages to the individual Pixels of the SLM.

9. The method of claim 8, wherein the SLM is a reflective liquid crystal display (LCD) device.

10. The method of claim 8, where the SLM is a reflective liquid crystal on silicon (LCOS) device.

11. The method of claim 8, wherein the SLM is a transmissive liquid crystal display (LCD) device.

12. The method of claim 8, wherein the coherent light source includes at least one of a light emitting diode and a laser.

* * * * *